Jan. 15, 1929.　　　A. G. RONNING ET AL　　　1,699,251
ENSILAGE HARVESTER
Filed Aug. 13, 1923　　　9 Sheets-Sheet 5

INVENTORS
Andrean G. Ronning
Adolph Ronning
BY THEIR ATTORNEYS

Jan. 15, 1929.

A. G. RONNING ET AL

1,699,251

ENSILAGE HARVESTER

Filed Aug. 13, 1923  9 Sheets-Sheet 6

INVENTORS
Andrean G. Ronning
Adolph Ronning
BY THEIR ATTORNEYS

Jan. 15, 1929.

A. G. RONNING ET AL 1,699,251

ENSILAGE HARVESTER

Filed Aug. 13, 1923   9 Sheets-Sheet 9

Fig. 18.

INVENTORS
Adrean G. Ronning
Adolph Ronning

By
Attorney

Patented Jan. 15, 1929.

1,699,251

UNITED STATES PATENT OFFICE.

ANDREAN G. RONNING AND ADOLPH RONNING, OF MINNEAPOLIS, MINNESOTA; JACOB A. RONNING AND ADOLPH RONNING EXECUTORS OF SAID ANDREAN G. RONNING, DECEASED.

ENSILAGE HARVESTER.

Application filed August 13, 1923. Serial No. 657,176.

Our invention relates to ensilage harvesters of the type wherein the corn stalks are cut from the ground and are cut or shredded into ensilage by the travelling machine.

The ensilage harvester proper is of a general type well known to the trade and it is associated with a tractor, by which it is moved and from which it is operated. Any common or well known type of tractor is adapted for the above noted association and use.

The ensilage harvester proper is located at one side of the tractor and is provided with a laterally extended ensilage elevator, by which latter the ensilage is adapted to be carried into a box or wagon driven or located at the other side of the tractor. The ensilage harvester and its elevator in plan form a sort of L-shaped structure in the angle of which the tractor is located.

The invention comprises various novel devices and combinations of devices that will be hereinafter described and defined in the claims.

In the accompanying drawings, which illustrate the invention, like characters indicate like parts throughout the several views.

Referring to the drawings:

Fig. 2$^a$ is a fragmentary view partly in side elevation showing parts found in the vicinity of the line marked 2$^a$—2$^a$ on Fig. 1, but with some parts sectioned on the line farther outward than the said line 2$^a$—2$^a$; and Figs. 2$^b$ and 2$^c$ are, respectively, a plan view and an end elevation of a beater-acting feed roller.

Of the parts of the tractor illustrated, it is desirable for the purposes of this case only to particularly note the tractor main frame 20, the rear traction wheels 21, the front steering wheels 22, and the worm gear shaft 23, which latter is the customary element of a common type of tractor arranged to cooperate with a worm gear and differential gear mechanism to transmit power from the tractor engine to the traction wheels. The rear end of the shaft 23, as is customary, is journaled in an anti-friction bearing 24 on the rear portion of a differential transmission housing 25. We utilize this shaft 23 as a convenient and desirable element for initial transmission of power from the tractor engine to the ensilage harvester proper, and hence a rearwardly extended shaft 26 is provided at its front end with a clutch member 27 that is detachably engageable with a clutch member 28, which latter is in the nature of an angular hub rigidly secured on the threaded rear end of said shaft 23. This shaft 26 is journaled in a tubular arm 29, the front end of which is rigidly but detachably secured to the housing 25. This arm 29 acts as a rigid cantilever extension of the tractor main frame, and at its rear end it is provided with a tubular transverse gear casing 30 in which is journaled a short transverse driving shaft 31. The rear end of the shaft 26 carries a bevel gear 32 that works within gear casing 30 and meshes with a bevel pinion 33 that is loose on the shaft 31 but adapted to be coupled thereto, at will, by a clutch collar 34 cut to slide on said shaft. The clutch collar 34, as shown, is adapted to be shifted by a lever 35 mounted in the casing 30 and adapted to be readily reached by the operator from the driver's seat 20'.

The ensilage harvester proper is preferably made in the form of an attachment which is carried in part by the tractor frame and in part by an auxiliary wheel 36. This wheel 36 is journaled on the crank-like end of a crank axle 37 which, in turn, is journaled to and supports a framework 38 of the ensilage harvester or attachment. This framework 38 is of skeleton form and is arranged to support a pair of laterally spaced forwardly projecting gathering frames 39. The rear lower portions of the gathering frames 39 are connected by an inclined deck 40, at the front edge of which a reciprocating cutter bar 41 is mounted. This cutter bar 41 is shown as provided with a sickle plate 42 that serves to cut the standing corn stalks from the ground. Means for reciprocating the bar 41 will be hereinafter described.

In the present machine, the corn stalks, after being severed from the roots, are carried rearward and upward on the inclined deck 40 by means of toothed feed belts in the form of sprocket chains 43 arranged to run obliquely over idle sprockets 44 and over driving sprockets 45 suitably mounted on the gathering frames 39. The sprockets 45 are arranged to be driven by shafts 46 which, at their lower ends, are provided with bevel gears 47 that mesh with bevel gears 48 on a transverse shaft 49 journaled in the framework 38 below the rear end of the deck 40.

Figure 1:
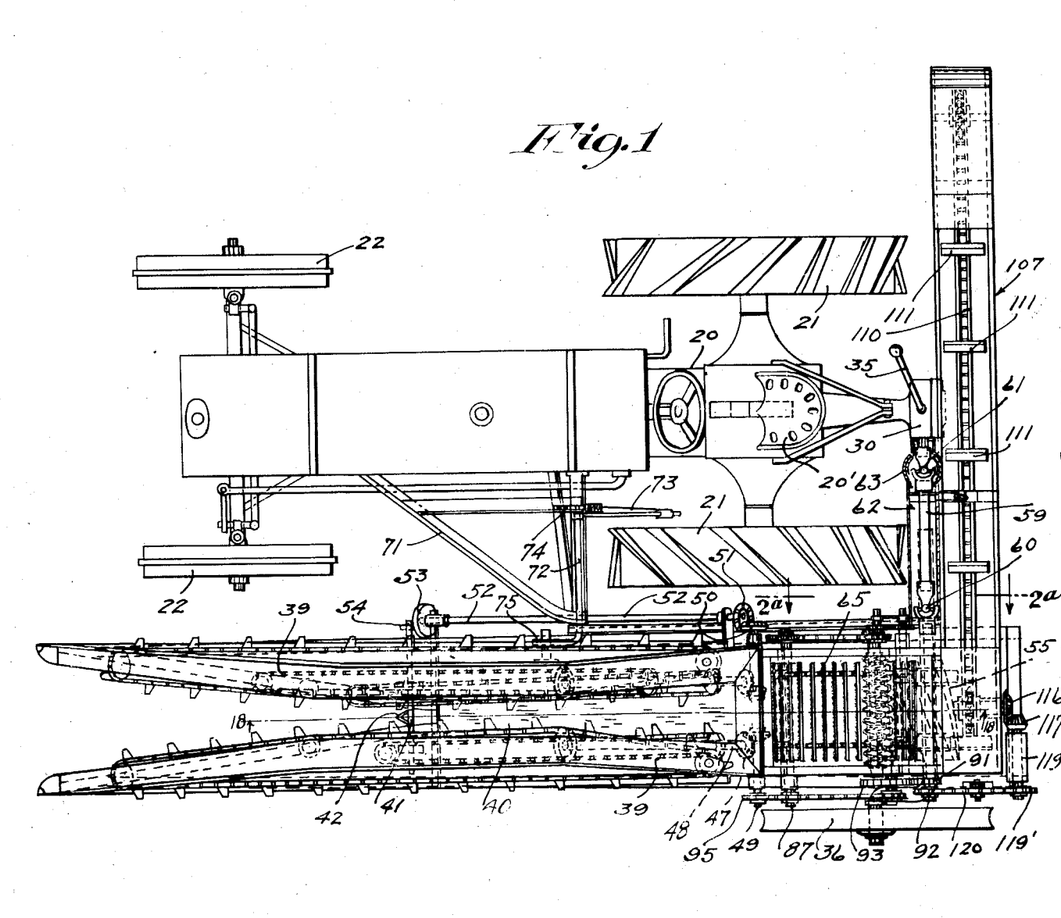
Fig. 1 is a plan view showing the complete ensilage harvester including the tractor.
Figure 5:
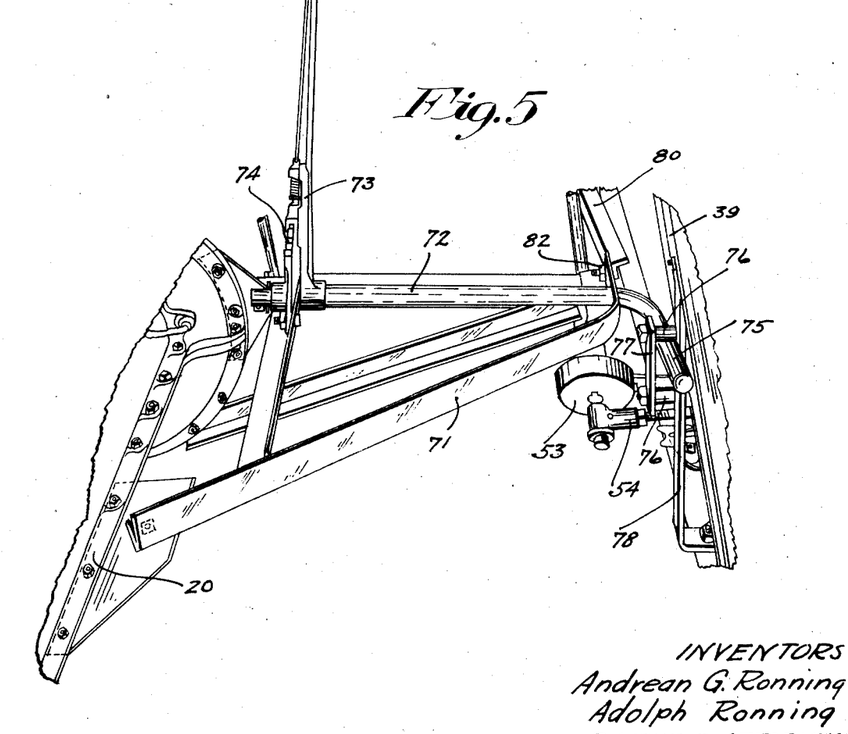
Fig. 5 is a detail in perspective showing the lifting section between the tractor and the ensilage harvester proper.

The transverse shaft 49, at its inner end, is provided with a bevel gear 50 that meshes with a bevel gear 51 on the rear end of a shaft 52 that is journaled in suitable bearings on the tractor side of the gathering frames 39 and the shaft 52 is provided, at its front end, with a crank disc 53 which operates a pitman 54 that is connected to the cutter bar 41, (see Figs. 1 and 5).

Figure 2:
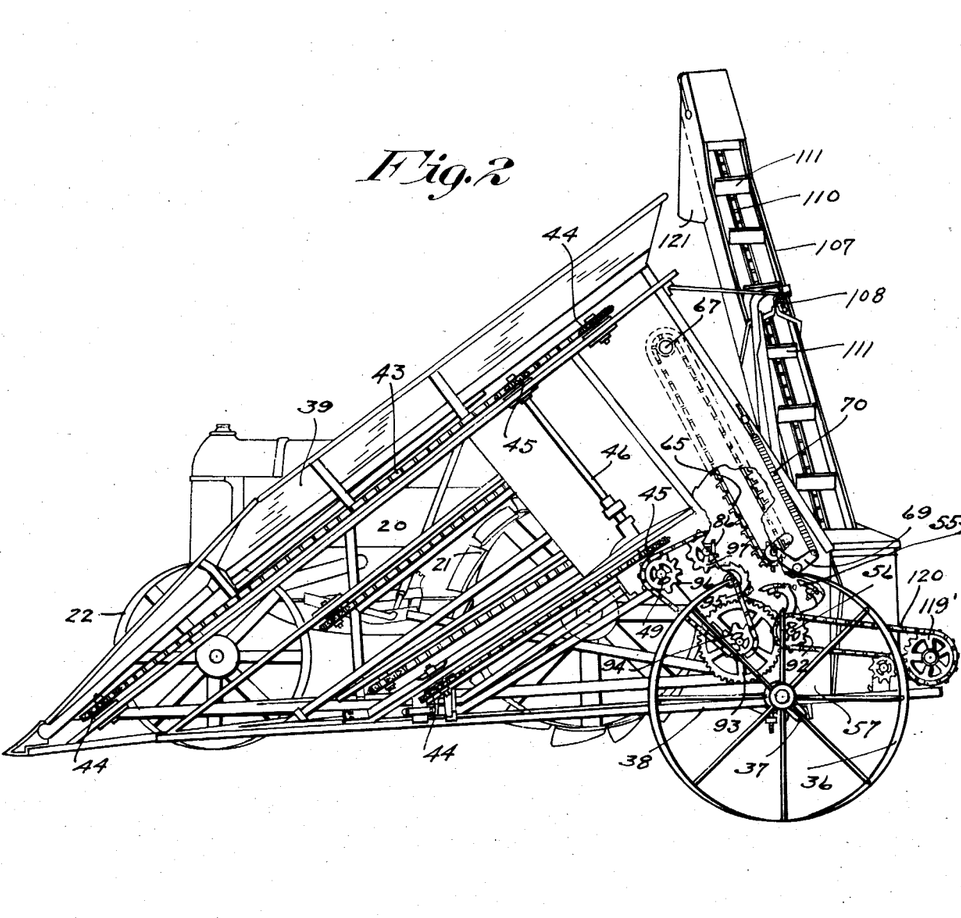
Fig. 2 is a left side elevation of the complete ensilage harvester, some parts being broken away.
Figures 6, 7, 8:
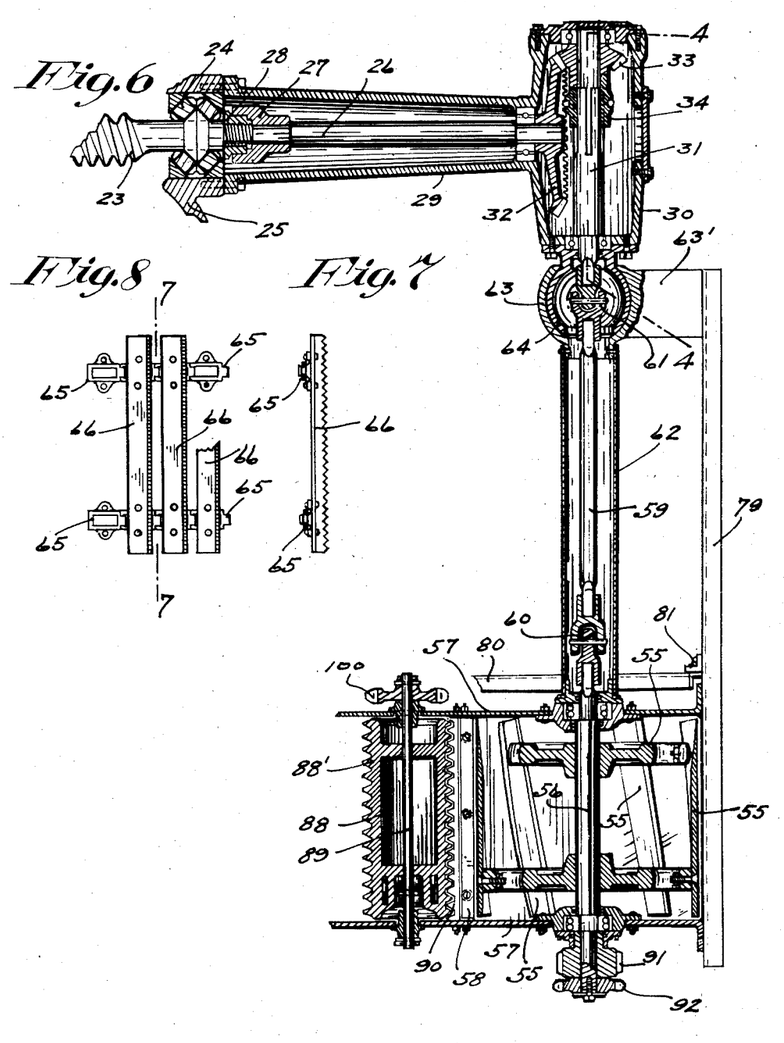
Fig. 6 is a horizontal section showing the means for driving the ensilage cutter from the tractor.
Fig. 7 is a detail in section on the line 7—7 of Fig. 8.
Fig. 8 is a plan view showing a portion of a stalk-feeding belt.

The ensilage cutter preferably herein employed is of the lawn mower type; that is, of a type comprising spiral cutting blades 55 which, by radial arms, are connected to a cutter shaft 56 journaled in suitable bearings on the housed end or box-like rear portion 57 of the harvester frame (see Figs. 2 and 6). This ensilage cutter is arranged on a transverse axis to rotate just rearward of and below the rear end of the inclined deck 40, and it co-operates with a relatively fixed shearing plate 58 suitably secured in the housing 57.

By reference to Figs. 1 and 6 it will be noted that the cutter shaft 56 is driven from the shaft 31 through an intermediate shaft 59 connected, respectively, to the shafts 56 and 31, by knuckle joints 60 and 61. The shaft 59 works in a relatively large tubular housing 62 which, at one end, is rigidly secured to the housing 57, and at its other end is provided with a two-part substantially spherical casing 63 that loosely engages over a head 64 rigidly secured to the adjacent end of the gear casing 30. In this way, the rear portion of the ensilage harvester is flexibly connected to the tractor frame with freedom for angular and vertical movements but is held substantially spaced from the tractor.

As an important feature, the stalks, which are in slightly inclined but substantially upright positions, are, by the sprocket chains 43, carried over and beyond the rear end of the deck 40 and are arranged to be engaged and positively fed downward by a nearly upright rake-acting feed belt. This rake-acting feed belt (see particularly Figs. 1, 2 and 8) is made up of sprocket chains 65 and angle iron cross slats 66, the projecting edges of which latter are serrated or provided with rake-acting teeth. The belt chains 65 run over a sprocket-equipped shaft 67 that is journaled in the upper rear portions of the gathering frames 39. Said belt chains 65 run under sprocket-equipped shaft 68 that is journaled in the projecting arms of a pair of bell cranks 69 intermediately pivoted to links 69ᵃ and subject to adjustable springs 70, the tension of which yieldingly holds the lower portion of the rake-acting belt forwardly but permits the same to yield under pressure from the stalks.

As already noted, the coupling devices above described and particularly shown in Fig. 6 afford one of the connections between the tractor and the ensilage harvester proper, but other connections are provided for causing the ensilage harvester to travel with the tractor while permitting the required relative movements and adjustments thereof. One of the most important connections is best shown in detail in Fig. 5, and is also shown in Figs. 1 and 2. The numeral 71 indicates a trussed bracket that is rigidly secured to the tractor frame 20 and projects toward the left therefrom and terminates close to the inner side of the inner gathering frames 39. Mounted for oscillatory movements in this bracket 71 is a rock shaft 72 equipped with a latch lever 73 that co-operates with a latch segment 74 rigidly secured on the bracket 71.

At its outer end, the rock shaft 72 has a radially projecting lifting arm 75 that works between vertically spaced studs 76 on the adjacent side of the gathering frame 39. The studs 76 are tied together by a retaining plate 77 and the lifting arm 75 works just inward of this plate 77 and just outward of the guide strip 78 that is rigidly secured to the inner gathering frame 39. Normally, the upper stud 76 will rest on the lifting arm 75. Said arm carries part of the weight of the ensilage harvester and the harvester may be vertically adjusted by oscillatory movements of the rock shaft 72 and lever 73. Also the arm 75 being engaged between the plates 77 and 78 serves to hold the ensilage harvester laterally spaced from the tractor. Under vertical movements imparted to the harvester by raising and lowering movements of the lifting arm 75, the gathering frames are oscillated vertically on the ground wheels 36 and on the ball and socket connection 63—64 between the gear case 30 and the tubular housing 62.

The ensilage harvester is held laterally spaced from the tractor by connections described and by a transverse beam 79, (see Fig. 6), one end of which is rigidly secured to the housing 57 and the other end of which is rigidly secured to a projection 63' of the outer spherical casing 63. The force required to cause the ensilage harvester to travel with the tractor is taken chiefly by a drawbar 80, which, at its rear end, (see Fig. 6), is pivotally connected at 81 to the tie-bar 79, and at its front end, (see Figs. 1 and 5), is pivotally connected at 82 to the offset bracket 71 of the tractor.

The rear portion of the ensilage harvester may be raised and lowered by oscillatory adjustments of the crank axle 37 and said axle is arranged to be given such oscillatory adjustments and to be held where set by means of an adjusting rod 83. This rod, at its upper end, has a large eye through which the crank portion of the axle 37 is passed and the other end of said rod is passed through the end of a beam 84 projected from the bottom of the housing 57. Below said bar 84, the rod 83 is threaded and provided with a nut 85, (see Figs. 2 and 3), by adjustments of which the crank axle may be set in different positions for the purpose stated.

Figures 2A, 2B, 2C:
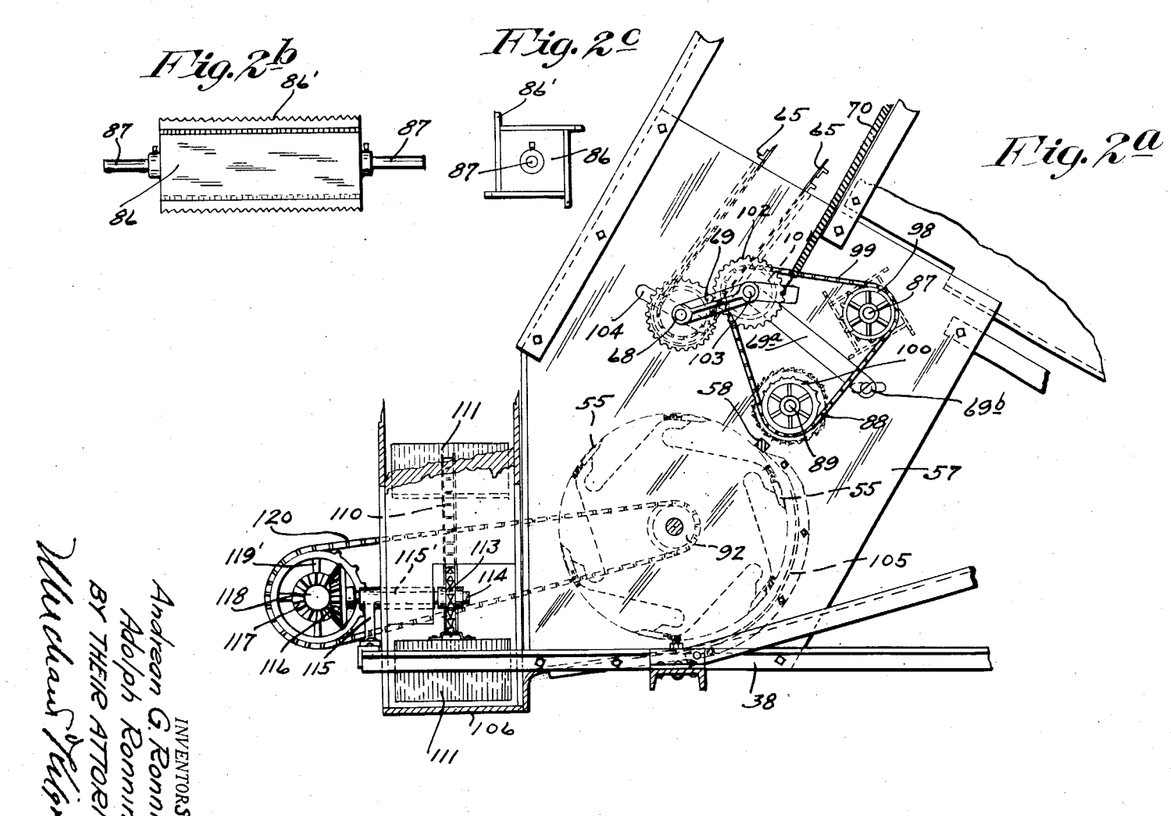

As the corn stalks are fed off from the rear end of the inclined deck 40, their downturned butt ends are engaged by an angular feed roller 86 secured to a shaft 87 journaled in the sides of the housing 57. As shown, (see Figs. 2ᵇ and 2ᶜ), said roller 86 has four plates 86' secured in rectangular arrangement and having serrated projecting edges that very positively engage the butt ends of the stalks and move the same longitudinally toward the downwardly moving side of the rake-acting belt 65. A quite similar construction to this and the method of operation is more clearly shown in Fig. 9 of our copending application Serial No. 724,422, which bears a filing date as of July 5th, 1924.

Figure 18:
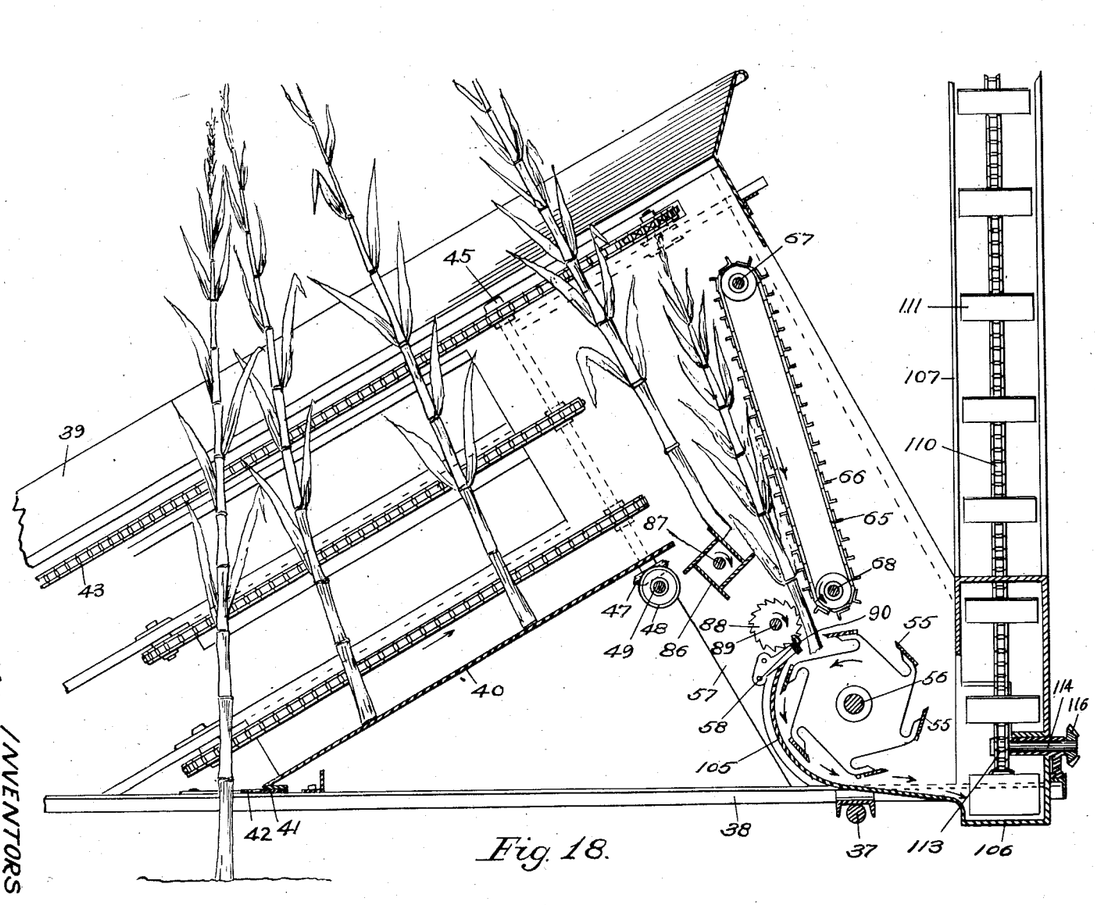
Fig. 18 is an enlarged sectional view, as seen substantially on the line 18—18 in Fig. 1, various parts being omitted.

By the conjoint action of the said rake-acting belt and feed roller just described, the stalks are fed butt ends downward to the ensilage cutter. On their way from the roller 86 to the ensilage cutter, the stalks are engaged with a feed stabilizing roller 88, (see Figs. 6 and 18), that is secured to a shaft 89 journaled in the housing 57. This roller 88 is circumferentially grooved and its ridges are cut to form ratchet teeth 88'. Said roller rotates in a clockwise direction in respect to Fig. 18 and it assists in feeding the stalks over the cutting edge of the shearing bar 58 at a uniform speed, but the ratchet teeth thereof, acting on the stalks, prevent the stalks from being jerked or shot downward too rapidly by the action of the rotary ensilage cutter. To prevent the stalks from being carried between the roller 88 and the shearing blade 58, we provide a comb-like blade 90, (see Fig. 6), secured to the housing 57 and working as closely as possible in the grooves of said roller.

It may here be noted that the stalks are positively gripped and carried rearwardly from the stalk cutter, in the usual manner, but there is an important distinction in the present stalk conveying system that is not found in other harvesters that have come to our attention, namely, in that the present machine provides means for maintaining this positive gripping, or feeding action, upon the stalks, from the time they are cut from the field until they have been fed into the ensilage cutter. Thus, the rearward ends of the gathering chains 43, and especially the upper pair of chains are continuously urging or crowding the stream of stalks (which is normally much heavier than shown in Fig. 18) back against the feed apron 65 with which the gathering chains cooperate to continue the grip on the stalk stream, and before the stalks entirely leave the gathering chains their butt ends are successively engaged by the rollers 86 and 88 which also cooperate with the downwardly moving feed apron to further continue the moving grip on the stalks. It will thus be seen that the stalks are at no time left in suspension, i. e., they at no time depend upon gravity to hold them in contact with a moving feed element. And being always positively gripped and conveyed from one cutter to the other they cannot bunch up and clog the machine, which has been an extremely aggravating objection to all the previous traveling ensilage harvesters we have observed.

The shaft 59, through the connections already described and best illustrated in Fig. 6, transmits power from the tractor to the ensilage harvester and to the cutter shaft 56, so that the latter becomes the primary power shaft of the ensilage harvester. At its projecting outer end, said shaft 56 is provided with a spur pinion 91 and with a sprocket 92. The pinion 91 meshes with a spur gear 93 that is journaled on the side of the housing 57 and carries a sprocket 94. A sprocket chain 95 runs over the sprocket 94 and over sprockets 96 and 97, respectively, on the outer ends of the shafts 49 and 87, (see Figs. 1 and 2). Means whereby the shafts 49 and 87 will be rotated to respectively operate the stalk-gathering belts and the angular feed roller 86, has already been described. Said shaft 87, at its inner end, (see particularly Figs. 1 and 2ª), is provided with a driving sprocket 98. A sprocket chain 99 runs over the sprocket 98 and over sprockets 100 and 101. The sprocket 100 is secured to the shaft 89 of the roller 88. The sprocket 101 and a spur gear 102 are secured to a floating shaft 103 that forms a pivotal connection between the bell cranks 69 and the links 69ª. Here it will be noted that the lower ends of the links 69ª are adjustably pivoted in the sides of the housing 57 at 69ᵇ, (see Fig. 2ª). By reference to Fig. 2ª, it will be seen that the lower arms of the bell cranks 69 constitute links that space the shafts 68 and 103 so that the former is free to move through the slots 104 in the sides of the housing 57 and which movement permits the lower end of the rake-acting belt to automatically move toward and from the rollers 86 and 88.

Figure 3:
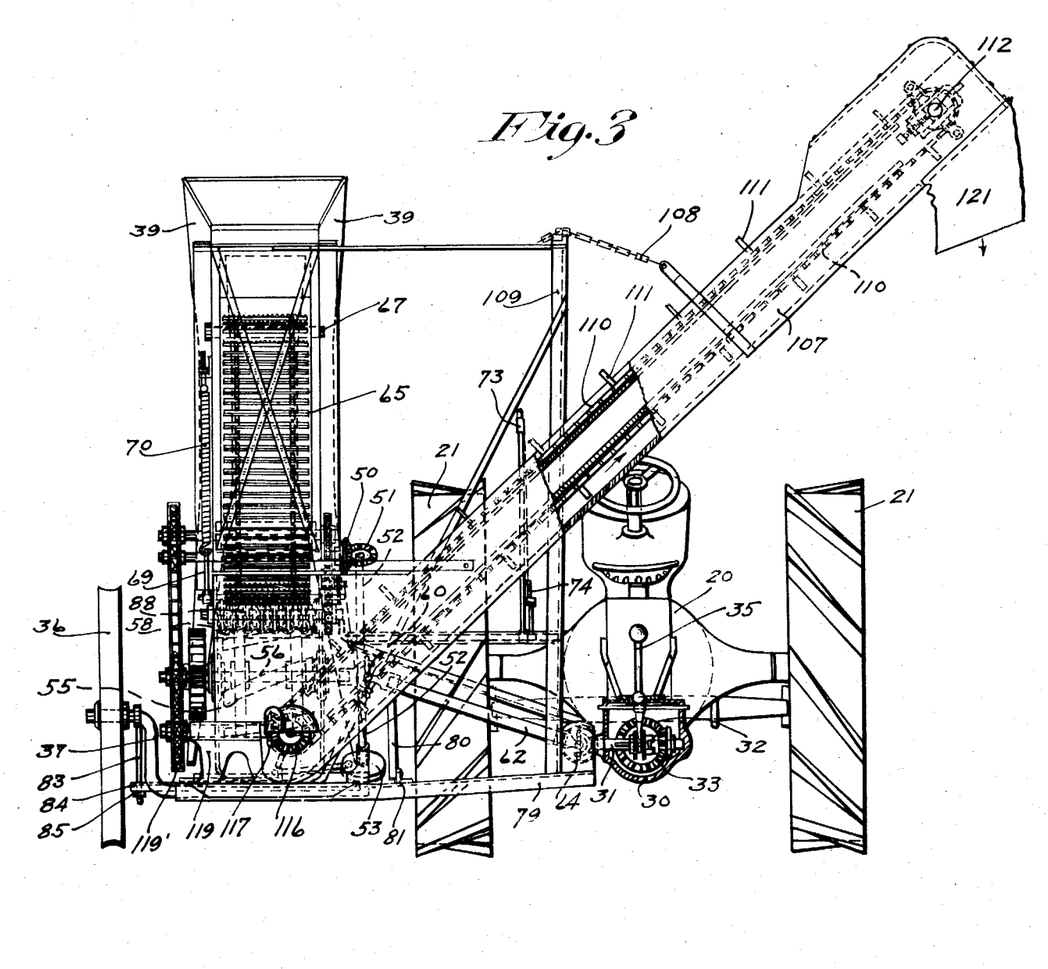
Fig. 3 is a rear elevation of the tractor shown in Fig. 1, some parts being broken away and some parts being sectioned.
Figure 4:
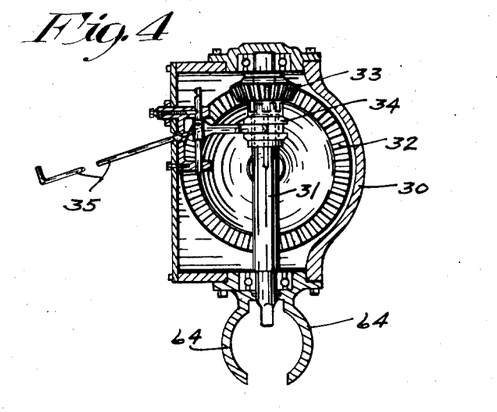
Fig. 4 is a detail in vertical section on the line 4—4 of Fig. 6.

By reference particularly to Fig. 2ª, it will be noted that the ensilage cutter co-operates with a segmental deck 105 that delivers into the boot 106 of a transversely and upwardly extended elevator leg 107, (see also Fig. 3, wherein the said leg is shown as in part supported by a chain 108 attached to a post 109, the latter of which is suitably braced and supported from the beam 79 and other parts of the ensilage harvester framework).

Working in the elevator leg 107 is an endless elevator belt in the form of a sprocket chain 110 that is equipped with propelling blades 111. The chain 110 runs over an idle sprocket-equipped shaft 112 mounted in the upper portion of the leg 107 and runs under and is driven by a driving sprocket 113, (see Fig. 2ª), carried by a short shaft 114 journaled in a suitable bearing 115 on the butt or lower portion of the leg 107 and provided at its outer end with a bevel pinion 116. The pinion 116 meshes with a bevel gear 117 carried by a short countershaft 118 journaled in a bearing 119 secured on the rear portion of the framework of the ensilage harvester. At its outer end, the shaft 118 is provided with a sprocket 119'. A sprocket chain 120 runs over the sprocket 119' and over the sprocket 92, which, as already described, is carried by the shaft 56 of the ensilage cutter. By the connections just described, the inclined elevator belt will be driven from the shaft of the ensilage cutter. Preferably, the elevator belt is arranged to carry the cut ensilage upward through the lower run or passage of the elevator leg 107. The said elevator leg, at its upper end, delivers to a discharge spout 121, from which the cut ensilage may be delivered into the box of a wagon driven at the right-hand side of the tractor.

Remarks.

The operation of the mechanism so far described is probably clear from the statements and comments already made, but may to advantage be briefly summarized as follows:

Under the advance movement of the harvester, the standing corn stalks will be severed from their roots close to the ground and, by the gathering belts, will be carried upward on the inclined deck 40 while held in upright but more or less forwardly inclined positions. As the butt ends of the stalks are passed off of the rear end of the deck 40, the gathering belts lose their grip on the stalks and the stalks are then delivered first onto the angular roller 86 and then against the downwardly moving side of the rake-acting feed belt 65—66. The angular roller 86, with its projecting serrated edges, acts as a beater and more or less as a shredder on the engaged stalks, but, moreover, it acts positively to deliver the butt ends of the stalks over the same and toward their final point of delivery to the ensilage cutter. The ratchet toothed roller 88, as already noted, assists in the feeding action and prevents over-feeding and, hence, acts as a sort of a feed stabilizer. Of course, gravity materially assists in the downward feed of the stalks to the ensilage cutter, but the rake-acting feed belt insures the proper feed and even delivery of the stalks to the ensilage cutter.

By the ensilage cutter, the stalks will be reduced to ensilage and the ensilage will be delivered to the elevator belt in a manner very obvious from the foregoing description.

The ensilage harvester so far described in detail is especially intended for use in cutting green corn stalks and for converting the entire stalk, including the ears, into green ensilage. Experiments have shown that ripe corn stalks including matured ears, can, with advantage, be harvested and cut up, much like ensilage, the cob sections and the corn kernels reclaimed and separated from the "roughage", and the latter, to wit: the dry cut stalk, stacked or otherwise stored and thereafter used as dry feed or for other purposes. The reclaimed corn, whether shelled or on the cob, will advisably be stored in cribs or other suitable containers.

To provide a machine especially adapted for doing the work just above outlined, we provide mechanism such as particularly illustrated in Figs. 9 to 17, inclusive. This mechanism, however, may be used for cutting green corn into ensilage. The dry corn stalks, usually designated as roughage, are not, in a strict sense of the word, ensilage, but nevertheless, for convenience, the complete machine may be still treated as an ensilage harvester, but it may also be treated as a universal corn harvester. In this modified construction, the numeral 107' indicates an elevator leg that corresponds to the elevator leg 107 already described and in which works the elevator belt 110'—111' that corresponds to the elevator belt 110—111. In this arrangement, however, the elevator leg 107' is incorporated in a casing 122, at the delivery side of which are two inclined elevator legs 123 and 124. Working in the elevator legs 123—124 are conveyor belts 125—126, respectively, preferably of the same type as the belt 110—111. Said belts 125—126, respectively, are driven by sprocket-equipped shafts 127—128. Preferably, said belts are driven in a direction so that the under sides of the belts deliver, respectively, to discharge spouts 129—130.

Secured in the casing 122, below the elevator leg 107', is a fan case 131 provided with an adjustable upwardly flaring air discharge spout 132. Working within the fan case 131 is a fan head or rotor 133, the shaft 134 of which projects and is provided at one end with a bevel gear 135 and at its other end with a sprocket 136. The fan shaft 134 is driven from the shaft 118 through a bevel gear 137 and a shaft 138. The gear 137 meshes with the gear 135 and the shaft 138 is connected to the shaft 118 by a knuckle joint 139. The fan case 131 has an adjustable air intake passage 140 that is made adjustable by means of a sliding gate 141, (see Fig. 9). The air discharge passage 132 is between laterally adjustable plates 142, by adjustments of which the direction of the blast may be varied.

Slightly below and more or less outward of the delivery end of the elevator leg 107' is a shaker made up of toothed bars 143 carried by crank shafts 144—145. The crank shaft 144 is directly journaled in the sides of the casing 122 and is provided at one outer end with sprockets 146 and 147. The crank shaft 145 is journaled in bearings 148 that are adjustable in segmental slots 149 formed in the sides of said case and extending concentric to the axis of the shaft 144. Mounted above the shaker 143 is a rotary beater in the form of a roller 150 having radially projecting pins. The shaft of this roller 150 projects and is provided with a sprocket 151, over which and the sprocket 147 runs a sprocket chain 152, (see Figs. 9 and 10). The sprocket-equipped shafts 127 and 128, which, as noted, drive the two elevator belts 125 and 126, are provided at their outer ends with sprockets 153 and 154, over which runs a sprocket chain 155. This completes the driving connections to the several movable parts of the additional harvester mechanism just described.

Figure 9:
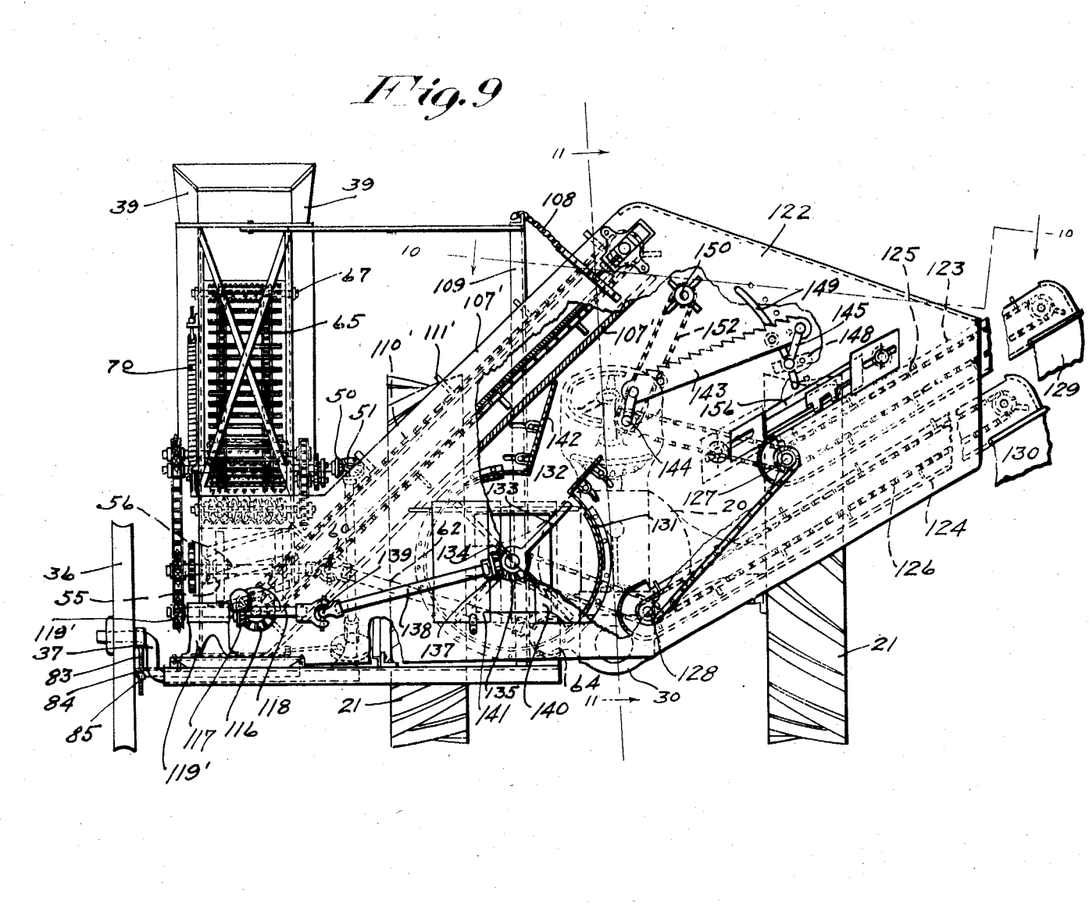
Fig. 9 is a view corresponding to Fig. 3, but illustrating a somewhat modified construction.
Figures 10, 11, 12, 13, 14, 15, 16, 17:
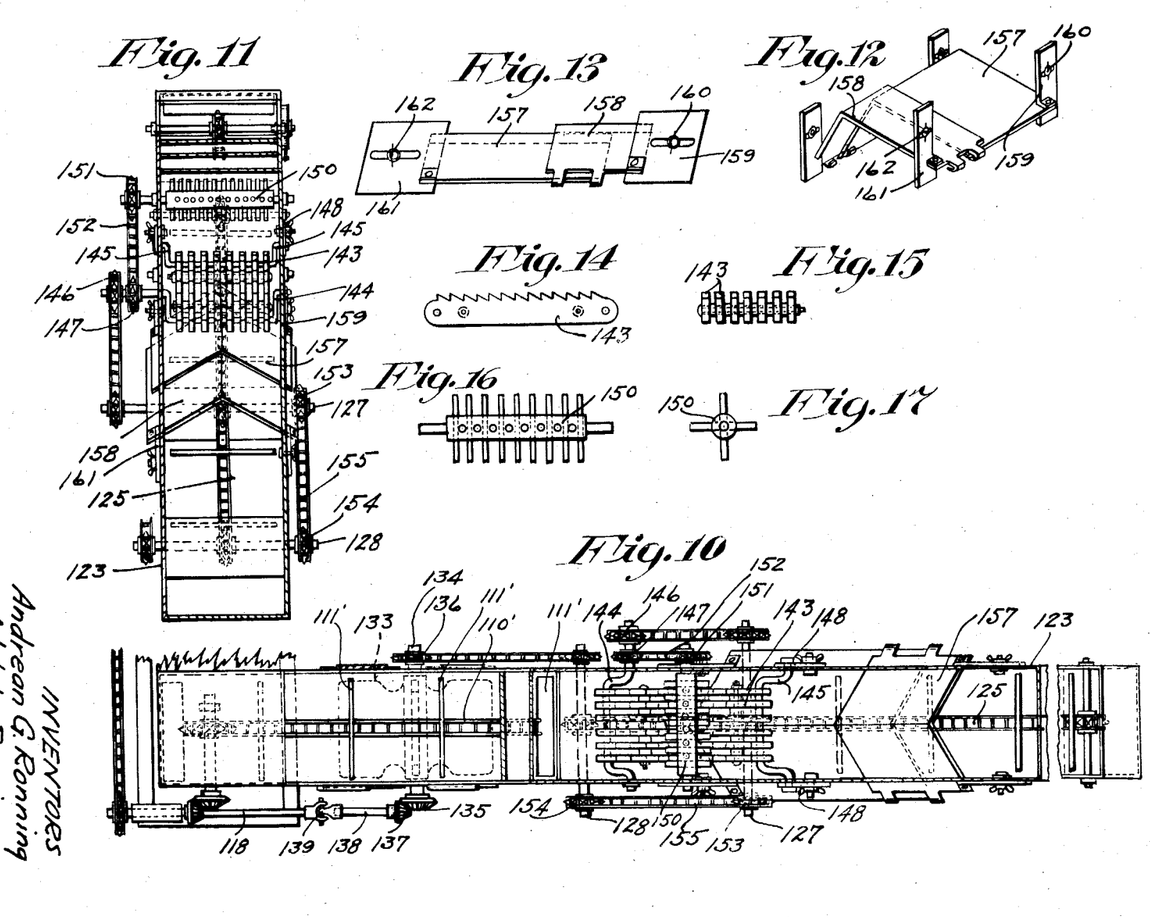
Fig. 10 is a plan view of the rear mechanism shown in Fig. 9, some parts being sectioned on the irregular line 10—10 of said view.
Fig. 11 is a vertical section on the line 11—11 of Fig. 9.
Fig. 12 is a perspective showing the so-called refuse-ejecting deck removed from the machine.
Fig. 13 is a side elevation of the deck shown in Fig. 12.
Fig. 14 is a side elevation of a tedder-acting shaker shown in Fig. 10.
Fig. 15 is an end elevation of the shaker shown in Fig. 14.
Fig. 16 is a plan view showing in detail the toothed feed cylinder shown as applied in Figs. 10 and 11.
Fig. 17 is an end elevation of the device shown in Fig. 16.

Extending parallel to but just above the lower portion of the upper elevator leg 123, the sides of the casing 122 are formed with long discharge passages or slots 156, (see particularly Fig. 9). Extending over and across the lower portion of said elevator leg 123, from the one slot 156 to the other, is an adjustable refuse ejecting deck shown as made up of two overlapped plates 157 and 158 that are inclined transversely in opposite directions from a central ridge, so that anything dropping on the said plates will be caused to roll or slide outward through one or the other of the passages 156. The plate 157 is provided with side flanges 159 that are secured to the sides of the case 122 by slot and bolt connections 160, and, likewise, the plate 158 is provided with side flanges 161 that are adjustably secured to the sides of said case by slot and bolt connections 162, as indicated in Figs. 10, 11, and 12.

The shaker cranks 144—145 and the beating roller 150 are rotated in an anti-clockwise direction in respect to Fig. 9, so that they tend to feed backward into the blast from the blower all particles of the ensilage or cut stalks and cobs that come into contact therewith. The blast from the blower tends to carry the cut stalks upward and over the beater and shaker and will cause the delivery of the cut leaves and lighter particles onto the downwardly moving upper portion of the elevator belt 125, the upper portion of which belt is exposed or uncovered.

The blast will, of course, have much less action on the heavier particles, such as the shelled corn and the unshelled cob sections or nubbins, and these, therefore, will by the shaker 143 be delivered onto the receiving portion of the elevator belt 126.

The particles such as dry pieces of cut corn stalk, which are much heavier than the leaves but lighter than the corn cobs, will be carried by the blast over the shaker 143 and will drop onto the ejecting deck 157—158 and by the latter will be discharged through the passages 156 and dropped upon the ground. Obviously, the higher the plate 157 is adjusted, the more of the cut stalks will be delivered onto the ejecting deck. Also, the lower down the plate 158 is adjusted, the greater the amount of material that will be caught on the deck and ejected thereby and, consequently, the less will be the amount of material delivered to the elevator belt 126. By adjustments of the two plates 157—158, substantially all of the shelled corn and corn on the cobs will be delivered to the elevator belt 126; the light roughage will be delivered to the elevator belt 125; and the hard dry pieces of corn stalk will be delivered onto the ejecting deck and discharged from the machine. The roughage discharge through the spout 129 and the corn discharged through the spout 130 may be delivered into different receptacles, such as the different compartments of a rack or wagon box.

Angular adjustments of the shaker 143 and also adjustments of the blast from the blower may be utilized to set the machine for the best kind of separation of the different parts of the stalks delivered from the so-called ensilage harvester.

The ensilage harvester or corn harvesting mechanism is especially adapted for application to certain types of tractors, but is not limited to such use and may, in fact, be applied to any tractor of the proper size and suitable character.

By reference to Fig. 2ª, it will be noted that the boot 106 is pivotally mounted on a sleeve-like extension 115' of the bearing 115.

What we claim is:

1. The combination in an ensilage harvester, of a primary cutter and a secondary cutter arranged rearwardly thereof, conveying means for delivering stalks rearwardly from the primary cutter, a rearwardly yieldable feeding device adapted to receive the stalks in an upright position from the conveying means and actuate them downwardly into the secondary cutter.

2. The combination in an ensilage harvester, of a primary cutter arranged forwardly in the machine, a secondary cutter arranged rearwardly in the machine, longitudinally arranged co-acting chains adapted to receive stalks cut by the primary cutter and deliver them to an upstanding position over the secondary cutter, and an endless feeding device having a portion arranged horizontally rearwardly of the delivery ends of certain of said chains, and operating in a plane substantially at right angles thereto, to receive the stalks in said upstanding position and feed them longitudinally down into the secondary cutter.

3. In an ensilage harvester the combination including a primary cutter and a secondary cutter, means for conveying stalks from the primary cutter to an upright position above the secondary cutter, and a feeding mechanism arranged to receive the stalks in said upright position and feed them down into the secondary cutter, said feeding mechanism including a substantially vertical endless feed belt arranged rearwardly of and in spaced relation with respect to the conveying means.

4. The combination with an ensilage harvester having a primary cutter, a secondary cutter, and means for conveying stalks from the primary cutter to the secondary cutter, of a feeding device adapted to receive the stalks directly from the conveying means and arranged to deliver them in a substantially vertical position down in to the secondary cutter, said feeding device consisting of an endless belt and a roller co-operating therewith.

5. The combination with an ensilage harvester having a primary cutter, an ensilage cutter, and means for conveying stalks from the primary cutter to the ensilage cutter, of a feeding device adapted to receive the stalks directly from the conveying means and arranged to deliver them down into the ensilage cutter, said feeding device comprising an endless belt and means projecting outwardly from the belt to engage the stalks, as they leave the conveying means, to affect a uniform delivery thereof into the ensilage cutter.

6. The combination with a harvester having an ensilage cutter and means for conveying stalks to a substantially upright position above the cutter, of a feed belt arranged to receive the stalks in said upright position and as they are delivered from the conveying means, and a feed roller arranged to co-act with the feed belt to feed such stalks in said upright position downwardly into the ensilage cutter.

7. The combination in a harvester having a primary stalk cutter and an ensilage cutter, of means for conveying the stalks from the primary cutter to approximately an upright position over the ensilage cutter, a feed apron arranged readwardly of the conveying means to receive stalks therefrom in said upright position, and a feed roller arranged forwardly of the feed apron to co-operate therewith to feed the stalks downwardly into the ensilage cutter, said roller being positioned so that the butt ends of the stalks will pass thereover when passing from the conveying means to the feed apron.

8. In a harvester the combination including, a stalk cutter, an ensilage cutter, means for conveying stalks from the stalk cutter to an upright position over the ensilage cutter, a feeding device having a throat through which the stalks are fed in said upright position down into the ensilage cutter, said device comprising a feed apron and a feed roller arranged forwardly thereof to form said throat, and means for mounting said roller and apron whereby said throat may be enlarged under pressure to accommodate a variable volume of stalks received from the conveying means.

9. In a harvester the combination including, a stalk cutter, an ensilage cutter, means for conveying stalks from the stalk cutter to an upright position over the ensilage cutter, a feeding device consisting of a feed apron and a feed roller co-operating with the lower end of the feed apron, means for yieldingly actuating said roller and apron toward each other, and means for applying power to the apron and roller whereby they will co-operate to feed the stalks down into the ensilage cutter.

10. The combination with the stalk cutter and ensilage cutter of an ensilage harvester, of a feeding device for feeding stalks into the cutter consisting of an apron and a pair of toothed rollers co-operating therewith and near the cutter end thereof, and means for simultaneously actuating said apron and rollers to operate the feeding device.

11. The combination with a stalk cutter and an ensilage cutter, of means for conveying stalks to the ensilage cutter from the stalk cutter, said means comprising rearwardly operating gathering chains, a downwardly operating apron adapted to receive and operate on the stalks as they leave the gathering chains, and a series of toothed cleats arranged on the apron to engage the stalks to actuate them downwardly into the ensilage cutter.

12. The combination with the stalk cutter and ensilage cutter of an ensilage harvester, of a feeding device for feeding stalks into the cutter consisting of an apron and a pair of toothed rollers co-operating therewith and near the cutter end thereof, a floating shaft arranged to carry the cutter end of said apron, a spring associated with the shaft to yieldingly actuate it toward the feed rollers, and means for simultaneously actuating said apron and rollers to operate the feeding device.

13. The combination with the stalk cutter and ensilage cutter of an ensilage harvester, of a feed belt arranged to receive stalks in an upright position and actuate them longitudinally down into the ensilage cutter, said belt having toothed cross members projecting therefrom to engage the stalks and affect a uniform feed thereof into the cutter.

14. The combination with the stalk cutter and ensilage cutter of an ensilage harvester, of a feed belt arranged to receive stalks and feed them longitudinally into the cutter, a toothed feed roller arranged near the delivery end of the belt to co-operate therewith in the feeding operation, means for driving said belt and roller, and a relatively fixed notched bar arranged immediately adjacent to the roller.

15. In an ensilage harvester, the combination of a primary cutter and a secondary cutter arranged rearwardly thereof, gathering chains operating longitudinally of the machine to convey stalks from the primary cutter to an upright position over the secondary cutter, and a feed belt arranged rearwardly of the gathering chains to receive said stalks therefrom and actuate them down into the secondary cutter, said feed belt being arranged so that its working surface may operate in a plane at substantially right angles to the planes of the gathering chains.

16. An ensilage harvester comprising a stalk cutter, an ensilage cutter, means for conveying stalks from the stalk cutter to the ensilage cutter, and means for segregating the cut ensilage into various kinds.

17. An ensilage harvester comprising a stalk cutter, an ensilage cutter, means for conveying stalks from the stalk cutter to the ensilage cutter, means for segregating the cut ensilage into various kinds, and means for delivering the respective kinds of ensilage from the machine.

18. An ensilage harvester comprising a stalk cutter, an ensilage cutter, means for conveying stalks from the stalk cutter to the ensilage cutter, and means for segregating the cut ensilage into various kinds, said segregating means including conveying devices for delivering the various kinds of the ensilage from the machine, and a shaker and blast creating means adapted to act upon the ensilage as it passes from the ensilage cutter to the said conveying devices.

19. An ensilage harvester consisting in combination of a stalk cutter, an ensilage cutter arranged to cut the stalks into ensilage, means for separating the ensilage into its constituent elements, means for delivering said elements from different parts of the machine, and means for simultaneously actuating said cutters and separating and delivering means.

20. A harvester comprising a primary cutter for severing stalks from the field, a secondary cutter for cutting stalks into ensilage, means, including chains acting upon the butt ends of the stalks, for conveying the stalks from the primary cutter to a substantially upright position above the secondary cutter, power operated feeding means, having a portion thereof disposed higher than the delivery end of said chains, for receiving stalks from the conveying means, and means adapted to act upon the butt ends of the stalks as the same are delivered from the chains for crowding said butt ends against the said mentioned portion of the feeding means.

21. A harvester comprising a primary cutter for severing stalks from the field, a secondary cutter for cutting stalks into ensilage, means, including a device acting upon the butt ends of the stalks, for conveying the stalks from the primary cutter to a substantially upright position above the secondary cutter, power operated feeding means, having a rearwardly yieldable portion thereof disposed at a higher level than the delivery end of said device, for receiving stalks from the conveying means, and means adapted to act upon the butt ends of the stalks as the same are delivered from said device for crowding said butt ends against the said mentioned portion of the feeding means, said mentioned portion of the feeding means being rearwardly yieldable whereby it may yield to the volume of stalks acted upon by the crowding means.

22. A harvester comprising a primary cutter for severing stalks from the field, a secondary cutter for cutting the stalks into ensilage, means for conveying the stalks from the primary cutter to a substantially upright position over the secondary cutter, means for receiving said stalks, when in said substantially upright position and forcibly gripping and feeding them down into the secondary cutter, and means, adapted to engage the butt ends of the stalks after they have been freed from the conveying means but before they are gripped by the feeding means, to positively impel the stalk butts from the conveying means toward the feeding means.

23. A harvester comprising a primary cutter for severing stalks from the field, a secondary cutter for cutting the stalks into ensilage, means, including conveyor chains, for conveying the cut stalks in a continuous stream from the primary cutter to a feeding position with respect to the secondary cutter, a feeding device for receiving the stalks when in said feeding position and feeding them into the secondary cutter, said feeding device having means cooperating with the conveyor chains so as to affect a gripping action therewith upon the stalk stream so that it will be positively actuated from the conveying means and into the feeding device.

24. In a traveling ensilage harvester the combination of a stalk cutter, an ensilage cutter, and means for conveying a stream of cut stalks from the stalk cutter and feeding it into ensilage cutter, said conveying and feeding means comprising a series of devices which cooperate to apply a continuous gripping action upon the stalks stream, independent of gravity, whereby the stream of stalks will be positively gripped and directed during its entire course from the stalk cutter to the ensilage cutter.

25. A harvester comprising a primary cutter for severing stalks from the field, a secondary cutter for cutting stalks into ensilage, means, including conveyor chains, for conveying the cut stalks in a continuous stream from the primary cutter to a feeding position with respect to the secondary cutter, a feeding device for receiving the stalks when in said feeding position and feeding them into the secondary cutter, said feeding device having yieldable means co-operating with the conveyor chains so as to affect a floating grip action therewith upon the stalk stream so that it will be positively actuated from the conveying means and into the feeding device.

26. A harvester comprising a primary cutter for severing stalks from the field, a secondary cutter for cutting the stalks into ensilage, means for conveying the cut stalks from the primary cutter to a substantially upright position over the secondary cutter, means for receiving said stalks, when in said substantially upright position and forcibly gripping and feeding them down into the secondary cutter, said feeding means comprising three cooperating members all of which are arranged to travel about parallel axes.

27. A harvester comprising a primary cutter for severing stalks from the field, a secondary cutter for cutting the stalks into ensilage, means for conveying the cut stalks from the primary cutter to a substantially upright position over the secondary cutter, means for receiving said stalks, when in said substantially upright position and forcibly gripping and feeding them down into the secondary cutter, said feeding means comprising three cooperating members one of which is yieldable with respect to the others whereby to accommodate a variable volume of stalks.

28. A harvester comprising a primary cutter for severing stalks from the field, a secondary cutter for cutting the stalks into ensilage, means for conveying the cut stalks from the primary cutter to a substantially upright position over the secondary cutter, means for receiving said stalks, when in said substantially upright position and forcibly gripping and feeding them down into the secondary cutter, said feeding means comprising three cooperating members at least one of which is arranged to engage the stalks before they are successively disengaged from the conveying means.

29. A harvester comprising a primary cutter for severing stalks from the field, a secondary cutter for cutting the stalks into ensilage, means for conveying the cut stalks from the primary cutter to a substantially upright position over the secondary cutter, means for receiving said stalks, when in said substantially upright position and forcibly gripping and feeding them down into the secondary cutter, said feeding means comprising three power driven throat forming members, and said feeding means being arranged so that it will receive and act upon the stalks before they have been freed from the influence of the conveying means.

In testimony whereof we affix our signature.

ANDREAN G. RONNING.
ADOLPH RONNING.